3 Sheets—Sheet 1.
J. H. GRAVES.
Cooking and Heating Apparatus.
No. 238,108. Patented Feb. 22, 1881.
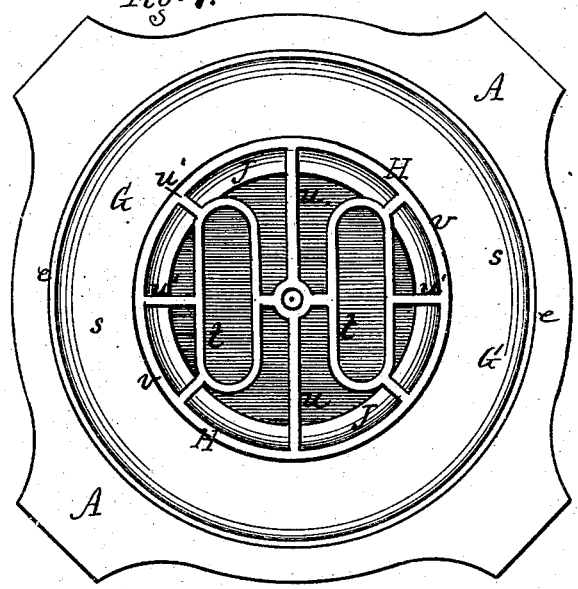
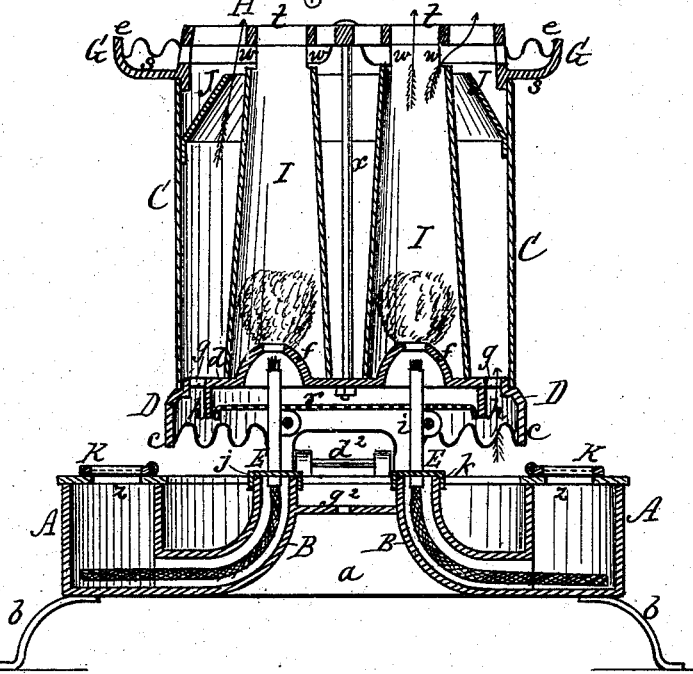
Attest.
Jacob Spahn
John C. Sims
Inventor.
John H. Graves,
pr R. L. Osgood,
Atty.
N. PETERS, PHOTO-LITHOGRAPHER, WASHINGTON, D. C.

3 Sheets—Sheet 2.
J. H. GRAVES.
Cooking and Heating Apparatus.
No. 238,108. Patented Feb. 22, 1881.
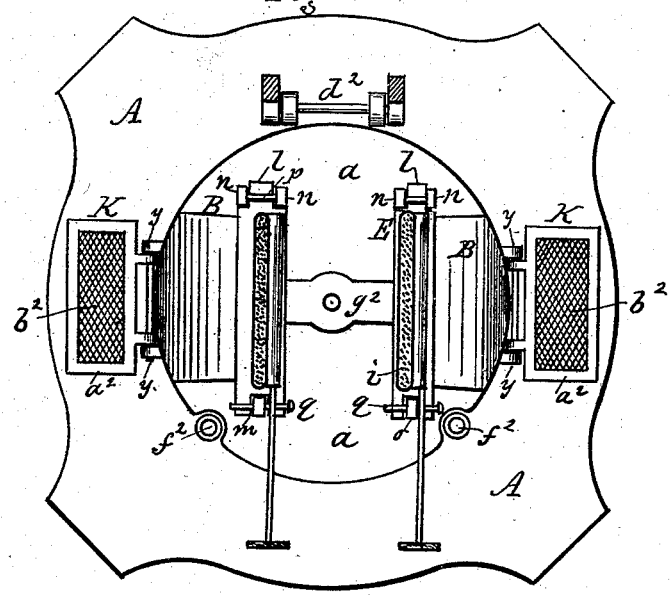
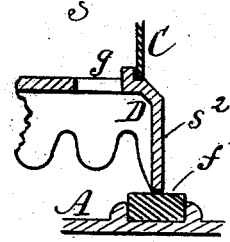
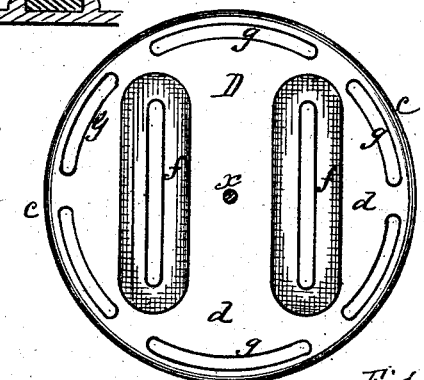
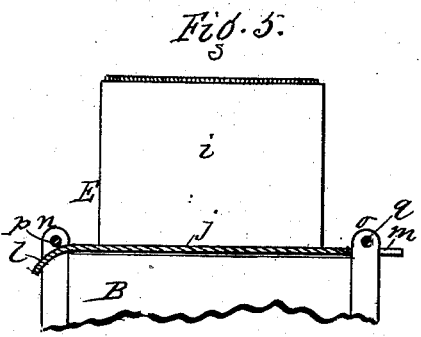
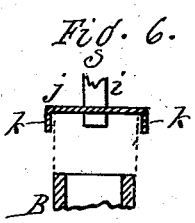
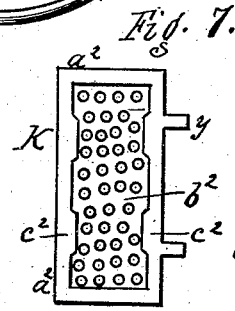
Attest.
Jacob Spuhr
John C. Burns
Inventor.
John H. Graves.
pr R. L. Osgood,
Atty.

3 Sheets—Sheet 3.

J. H. GRAVES.
Cooking and Heating Apparatus.

No. 238,108. Patented Feb. 22, 1881.

Attest.
Jacob Spahn
John C. Burns

Inventor.
John H. Graves,
per R. F. Osgood,
Atty.

UNITED STATES PATENT OFFICE.

JOHN H. GRAVES, OF ROCHESTER, NEW YORK, ASSIGNOR TO FRANCIS TULLEY, JR., OF SAME PLACE.

COOKING AND HEATING APPARATUS.

SPECIFICATION forming part of Letters Patent No. 238,108, dated February 22, 1881.

Application filed May 3, 1879.

*To all whom it may concern:*

Figure 9:
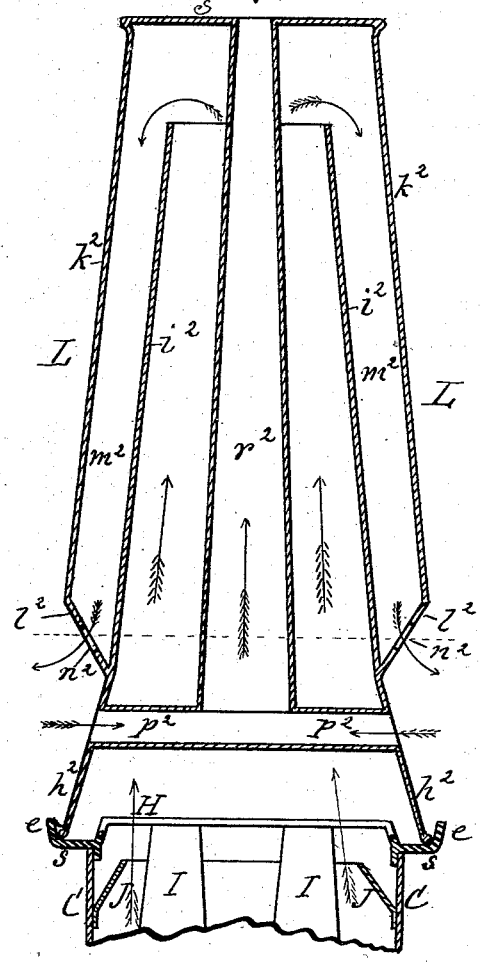
Figure 10:
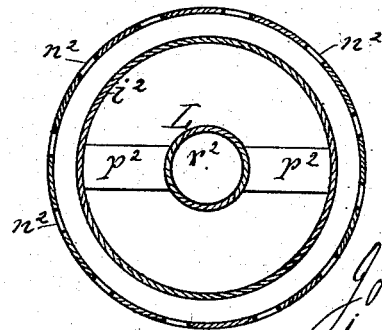

Be it known that I, JOHN H. GRAVES, of the city of Rochester, county of Monroe, and State of New York, have invented a certain new and useful Improvement in Cooking and Heating Apparatus; and I do hereby declare that the following is a full, clear, and exact description of the same, reference being had to the accompanying drawings, in which—
Figure 1 is a plan of the apparatus. Fig. 2 is a central vertical section of the same. Fig. 3 is a plan of the base and its connecting parts. Fig. 4 is a plan of the cone-plate. Figs. 5 and 6 are views of the wick-tube and fastening.
Fig. 7 is a plan of one of the ventilating and gas-escape covers. Fig. 8 is a detail view, showing one of the wood packing-blocks in the top of the oil-fount and the foot of the cylinder resting thereon. Figs. 9 and 10 are longitudinal and cross sections, respectively, of the heating-drum.

My improvement relates to cooking and heating apparatus in which kerosene-oil is used as the fuel.
The invention consists in the construction and arrangement of parts hereinafter more fully described and claimed.

A represents the oil-fount, which forms the base of the stove. It is preferably made of cast-iron, suitably japanned, and is in the form of a hollow annular ring, provided with a separate top cemented on. This ring incloses an open central space, $a$, as large as or larger than the cylinder that rests above it, so that all the heat that is thrown down by the burners will be expended in said space and will not fall on the oil-fount. This central space also allows free passage of cold air to the cylinder. The ring is supported by suitable feet, $b\ b$, which are cast with it.

B B are wick-tubes, cast solid with the oil-ring, and extending from the bottom of the same inward through the space $a$ and curving upward, their upper ends being open to receive the wick-tubes proper. The oil-ring A is preferably made of the ornamental scalloped form indicated in Fig. 3, but may be made of any other form desired.

C is the cylinder for containing the burners and connecting parts. It is of sheet metal, and of the form ordinarily used in oil-stoves.

D is a cone-plate made of cast-iron and forming the base-piece which supports the cylinder. It consists of an outer scalloped flange, $c$, a horizontal web, $d$, and deflectors or cones $f\ f$, with slots in the center, which rest over the burners. Near the periphery are a series of slots, $g\ g$, which open up into the cylinder C, and allow the cold air at the bottom to pass up into the cylinder outside of the chimneys or heat-conductors, presently to be described. The cone-plate has also a downwardly-projecting flange, $h$, of smaller diameter than the outer flange, and the cold air in passing up through the slots $g\ g$ passes between these two flanges.

E E are the burners, having the wick-tubes proper, $i\ i$, which extend up beneath the cones $f\ f$, and are provided with wicks, which extend down through the wick-tubes B into the oil-ring. The tubes $i\ i$ are attached permanently to rectangular bearing-plates $j\ j$, provided with vertical side flanges, $k\ k$, which fit accurately over and cover the open ends of tubes B B.
When so fitted the flanges $k\ k$ embrace the sides of the tubes B B, thereby firmly seating the bearing-plates and preventing their rocking and opening the joints between the plates and tubes. At one end of the bearing-plates $j$ is formed a narrowed central tongue, $l$, and at the other end is formed a central slot or cavity, $m$. The wick-tubes B are provided at one end with two side lugs, $n\ n$, and at the other end with a central lug, $o$. A fixed pin, $p$, passes through the two side lugs, $n\ n$, and a removable pin, $q$, is used in connection with the central lug, $o$. To fasten the bearing-plate $j$ in place the curved tongue $l$ is inserted between the side lugs, $n\ n$, and beneath the fixed pin $p$, and the other end of the bearing-plate is thus forced down, so that the notch or slot $m$ shall embrace the lug $o$, after which the removable pin $q$ is inserted in the lug above the plate.
By the means above described a firm and secure locking attachment is made between the burners and the wick-tubes B, which is readily disengaged, and which makes a close joint with said wick-tubes, and obviates danger of fire communicating with the oil-ring, and the flanges $k\ k$ overlapping the sides of the wick-tube prevent any rocking motion. In these respects it is safer and more effective than where the plate is simply pinned loosely down.

r is a perforated or wire screen-plate resting around the tubes i i and beneath the cones f f.

G is the cast-iron cap which forms the top of the stove, and to which the top of cylinder C is attached. It has an outside scalloped flange, e, a horizontal closed web, s, which forms a bearing for the heating-drum on top, and in the center and covering the cylinder-space is a skeleton-frame, H, of open-work, forming a spider, which is elevated somewhat and of the form indicated in the plan view, Fig. 1. This frame consists of oval or elliptical shaped rings t t, which form the attachments and bearings for the tops of the chimneys or heat-conductors, a straight bar, u, and connecting-bars u' u', that attach to the outer ring, v.

I I are the chimneys or heat-conductors, which extend from the cone-plate D upward to and are connected with the rings t t of the top cap. These chimneys inclose the flame and convey the direct heat upward to the top of the stove. The sides of the chimneys, just beneath the rings, are, however, cut away, forming openings w w, Fig. 2, so that the direct heat carried up by the chimneys, when it reaches the top, is partially deflected, a portion passing directly up through the open rings t t and a portion out through the side openings, w w, being thereby diffused over a large surface at the very point where it is most effective. The ends of the chimneys, in cross-section, are extended up to form the attachment to the rings before described. The skeleton form of the raised casting H, it will be seen, allows free passage of the heat not only from the chimneys, but also all the radiated heat that passes up through the cylinder outside the chimneys.

x is a bolt or rod which secures the cap to the cone-plate.

J is a conical jacket near the top of the cylinder, which inclines upward and inward to contract the draft around the top of the chimneys. Sufficient space is left at the top to allow free exit of the draft. The cold air, entering at the bottom through the slots g g, becomes highly heated from the radiation, and as it rises is concentrated toward the chimneys by the conical jacket, and, in addition to the direct heat from the chimneys, forms a heavy volume of heated air, which may be used for cooking, or, in connection with the drum or radiator used on top of the stove, be used for heating purposes.

K K are flat covers or doors, which are hinged at y y, so as to turn upward. They rest over openings z z in the top of the oil-ring, in line with the wick-tubes. By opening these covers the wicks can be reached at any time for adjustment. The oil-ring is filled through these openings. These covers consist each of a frame, $a^2$, and a perforated sheet-metal or wire-cloth plate, $b^2$. The plate is held in the frame by means of projecting lugs $c^2$ $c^2$, cast on top and bottom of the frame, as shown in Fig. 7. These screen-covers serve two important purposes: first, they allow free escape of such gas as is generated by the heat inside the oil-ring, and therefore obviate danger of explosion, and, second, they serve as a protection against ignition of the oil, on the same principle as in the safety-lamp. In these respects they are much more effective than solid covers before used. They also serve to keep the oil cool by the free passage of cold air through the screens, and its circulation through the oil-ring from one cover to the other.

$d^2$ is a hinge or joint, by which the cylinder C is connected with the oil-ring A, and by which the cylinder may be turned back to reach the burners. $f^2$ $f^2$, Fig. 3, are wood blocks resting in sockets cast on the oil-ring, and upon which blocks feet $s^2$, cast on the under side of the cone-plate D, strike. These support the cylinder in the proper upright position, and, in addition, serve as non-conductors to prevent transmission of heat from the cylinder to the oil-tank. The wood blocks also serve as pads to break the blows of the upper section of the stove in turning down; also prevent noise. They also are indented by the striking of the feet of the stove upon them, and therefore hold the feet in position and prevent slipping. The blocks, by being embedded and inclosed in their sockets, are prevented from crushing out, thus always keeping their form while serving as pads, as above described.

$g^2$ is a cross-bar connecting the two wick-tubes B B, and provided with a hole in the center, by which means two of the stoves may be permanently connected by a bent iron passing from one stove to the other, and secured, by bolts or screws, in the central holes. Any desired number of the wick-tubes and burners—from one upward—may be used as may be desired.

L is the heating-drum or radiator, which is used on top of the stove for heating rooms or for other purposes. The bottom $h^2$ is left entirely open, and fits closely inside the flange e, and upon the horizontal web s of the cap. From this point a conical chimney, $i^2$, extends up to suitable height, and is open at the top. The whole heat from the stove passes up through this chimney, and is discharged at the open top.

$k^2$ is a conical jacket or case surrounding the chimney, being closed at the top, and uniting with the chimney at a suitable distance above the base by a reverse conical rim, $l^2$. A jacket-space, $m^2$, is left all around between the chimney and jacket, and at the bottom are a series of holes, $n^2$ $n^2$, which open into the outer air. All the heated air which passes up the chimney $i^2$ is discharged into the jacket-space $m^2$, and thence passes downward and out through the holes $n^2$ $n^2$, so that, in addition to the natural radiation of heat from the drum, a positive current of heated air is constantly being poured out, by which an ordinary room may be very quickly heated.

$p^2$ is a cross-tube extending across the lower part of the drum and opening outward at each end.

$r^2$ is a vertical tube, which extends up from the cross-tube and opens through the top of the drum. A current of cold air enters each end of the cross-tube, becomes heated, and ascends the vertical tube and escapes at the top, so that additional heat is produced in the room by this circulation of air through the drum.

Having thus described my invention, I do not claim, broadly, a packing forming a non-conductor of heat between the cylinder and oil-fount; nor do I claim feet or standards between the cylinder and oil-fount for preventing passage of heat, as I am aware that such are well known; but

What I claim as new, and desire to secure by Letters Patent, is—

1. In an oil-burning stove, the locking attachment of the burners to the wick-tubes, consisting of the tongue $l$ on one end of the bearing-plate $j$, the central slot or cavity, $m$, on the other end, in combination with the projecting lugs $n\ n\ o$ of the wick-tube B, the tongue passing between the lugs and beneath a pin at one end, and the slot embracing the lug and secured by a pin passing over the end of the plate at the other, as shown and described, and for the purpose specified.

2. In an oil-burning stove, the elevated skeleton-frame H, consisting of the oval rings $t\ t$, the cross-bar $u$, and connecting-bars $u'\ u'$, extending to a circular outer ring, $v$, as shown and described, and for the purpose specified.

3. In an oil-burning stove, the combination, with the elevated frame H, provided with the oval rings $t\ t$, of the chimneys I I, attached to said rings, and provided with side openings, $w\ w$, as shown and described, and for the purpose specified.

4. In an oil-stove, the combination, with the chimneys I I, provided with the side openings, $w\ w$, of the conical jacket J, extending from the sides of the stove to a point just below said openings $w\ w$ and closely surrounding the chimneys, so that the heat which ascends the cylinder outside of the chimneys shall be concentrated to join with the heat that passes through the side openings of the chimneys, as herein shown and described.

5. In an oil-burning stove, the combination, with the oil-ring A, provided with the openings $z\ z$, of the covers K K, provided with a perforated or wire-cloth screen, $b^2$, for the purpose of ventilating the oil-ring, allowing free escape of gas from the same, and preventing ignition of the oil, as herein shown and described.

6. In an oil-stove, the combination of wood blocks $f^2\ f^2$, set into sockets in the top of the base of the stove, and feet on the bottom of the drum or cylinder coinciding with said wood blocks, the blocks serving as non-conductors of heat, and also as pads to prevent breakage of the parts and obviate noise, as herein set forth.

7. In combination with the top of an oil-stove, the open-bottomed heating-drum L, constructed with the chimney $i^2$, inclosing-jacket $k^2$, with discharge-holes $n^2\ n^2$, and the cross-tube $p^2$ and the connecting vertical tube $r^2$, as shown and described, and for the purpose specified.

In witness whereof I have hereunto signed my name in the presence of two subscribing witnesses.

J. H. GRAVES.

Witnesses:
GEO. W. GRAVES,
R. F. OSGOOD.